June 10, 1958     H. S. MESHORER     2,837,843

METHOD OF AND MEANS FOR REPOINTING WORN TEETH

Filed March 29, 1956     3 Sheets-Sheet 1

INVENTOR.
HERMAN S. MESHORER
BY
ATTORNEYS

June 10, 1958  H. S. MESHORER  2,837,843
METHOD OF AND MEANS FOR REPOINTING WORN TEETH
Filed March 29, 1956  3 Sheets-Sheet 2

INVENTOR.
HERMAN S. MESHORER
BY
ATTORNEYS

United States Patent Office 2,837,843
Patented June 10, 1958

2,837,843

METHOD OF AND MEANS FOR REPOINTING WORN TEETH

Herman S. Meshorer, Shaker Heights, Ohio

Application March 29, 1956, Serial No. 574,825

9 Claims. (Cl. 37—142)

This invention relates, as indicated, to a method of and means for repointing worn teeth of excavating implements and the like.

It has heretofore been proposed, as in U. S. Patents Nos. 2,369,285 and 2,603,985, to repoint the teeth of dippers, buckets and other power driven excavating implements, but these methods have, in general, proven unsatisfactory, due to the necessity of performing extensive welding operations in connection with these methods, and the great care which must be exercised in the welding.

The present invention has, as its primary object, a method of repointing such teeth, in which a welding operation is required only in connection with the first replacement, additional replacement teeth being thereafter attached in position by a simple and inexpensive mechanical means.

Another object of the invention is to provide a replacement tooth which is of extremely simple construction, enabling it to be manufactured at low cost, and in commercially desirable quantities.

A further object of the invention is to provide a novel adaptor, which can be easily and quickly attached to a worn tooth, and to which the replacement tooth can be quickly attached.

Other objects and advantages of my invention will be apparent during the course of the following description.

In the accompanying drawings forming a part of this specification and in which like numerals are employed to designate like parts throughout the same, Fig. 1 is a side elevational view of a conventional tooth of an excavating implement, showing the manner in which the tooth is worn down, after a period of use;

Figure 1:
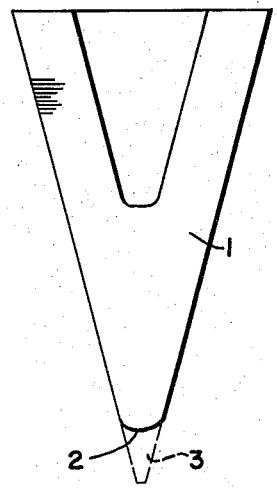
Figure 2:
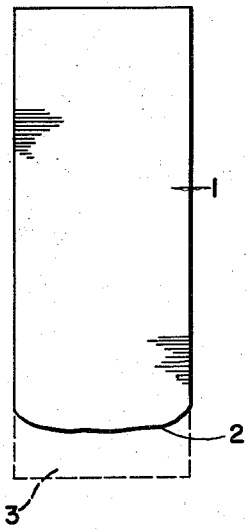
Fig. 2 is a bottom plan view of the tooth of Fig. 1.

Referring more particularly to Figs. 1 and 2, reference numeral 1 designates a conventional tooth of an excavating implement, showing the approximate contour of the working edge 2 thereof, after the portion 3 of the original tooth has been worn or eroded after a period of use.

Figure 3:
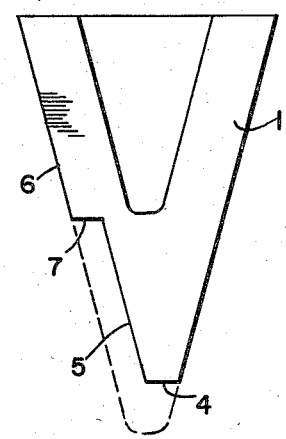
Fig. 3 is a view similar to Fig. 1, but showing the first step in the method of the present invention.
Figure 4:
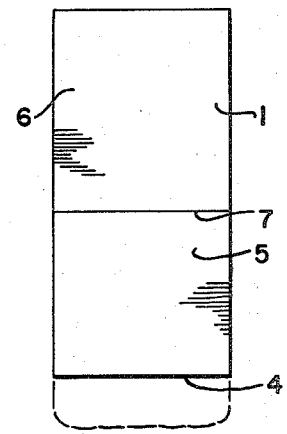
Fig. 4 is a bottom plan view of the tooth shown in Fig. 3.

The worn tooth of Figs. 1 and 2 is then subjected to a flame cutting operation, or other operation, in which portions of the tooth are cut away to provide, as shown in Figs. 3 and 4, a shoulder 4, which lies in a plane substantially perpendicular to the longitudinal axis of the tooth, a surface 5, which lies in a plane generally parallel with the bottom surface 6 of the worn tooth, and a second shoulder 7 which lies in a plane spaced rearwardly from and generally parallel with the shoulder 4. Flame or torch cutting operations are generally preferred for cutting or removing the aforesaid portions, due to the toughness and hardness of the metals which are usually employed in the manufacture of these teeth, and which properties render it impossible or economically unfeasible to remove such portions by cutting, sawing or machining operations.

Figure 5:
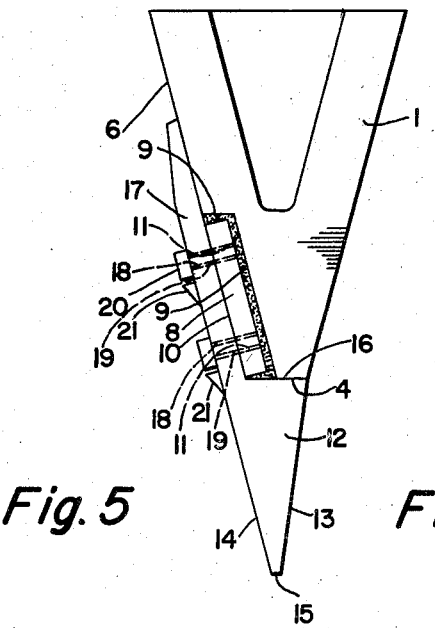
Fig. 5 is a view similar to Fig. 3, but showing the repointed tooth.
Figure 6:
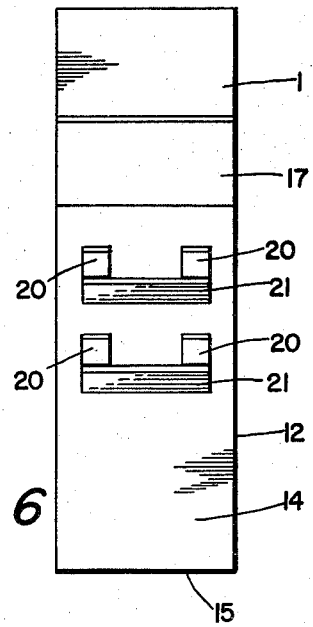
Fig. 6 is a bottom plan view of the repointed tooth of Fig. 5.

Following the removal of the portions of the worn tooth, as described, there is then secured to the surface 5 an adaptor plate 8 (Figs. 5 and 6) which is substantially coextensive in area with the surface 5, and is of a thickness such that when the plate is permanently welded to the surfaces 5 and 7, as by weld metal 9, the outer surface 10 of the adaptor plate is substantially flush with the bottom surface 6 of the worn tooth 1.

The adaptor plate 8 is of generally rectangular shape, and is provided with spaced, threaded openings 11, which serve a purpose to be presently described.

The replacement tooth is generally indicated by reference numeral 12, and is of the same width, as the tooth 1. It has top and bottom surfaces 13 and 14, respectively, which converge to a relatively sharp working edge 15. The replacement tooth 12 is provided with a shoulder 16 which is adapted for abutment with the shoulder 4, and rearwardly of this shoulder, the replacement tooth is provided with an extension or tongue 17, which is generally parallel with the surface 6 and adaptor plate 8, and overlies the adaptor plate.

The extension or tongue 17 is provided with openings 18, which, when the replacement tooth is in proper position on the worn tooth 1, are in registration with the openings 11, so that the replacement tooth may be firmly, yet removably, secured to the adaptor plate 8, by means of bolts 19, having square heads 20. These bolts pass through the openings 18 and are threaded into the openings 11.

It is thus seen that I have provided a method of repointing worn teeth, in which a welding operation is required only in connection with the securement of the adaptor plate to the worn tooth. After the replacement tooth 12 becomes worn, additional replacement teeth may be attached to the adaptor plate, by removing the worn replacement tooth, and bolting the new teeth to the adaptor plate.

The replacement tooth is of extremely simple construction, enabling it to be manufactured at low cost, and in commercially desirable quantities. Moreover, replacement teeth of various sizes and shapes may be secured to the worn tooth.

For the purpose of preventing the heads 20 of the bolts 19 from becoming worn or broken off in the course of use of the replacement teeth, the replacement tooth 12 may, if desired, be provided with tapered lugs 21, which may be formed integrally with the replacement tooth, these lugs acting to prevent impact or wear on the heads of the bolts.

Figure 7:
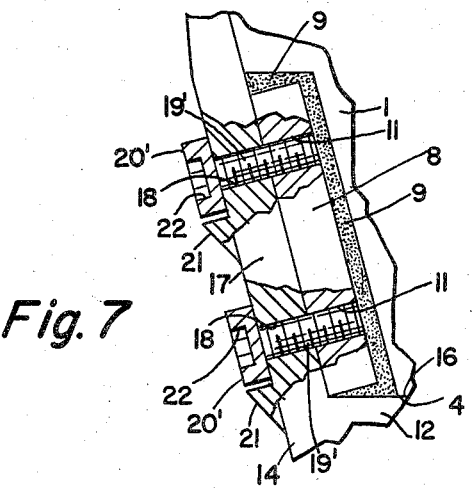
Fig. 7 is a fragmentary view, partly in elevation and partly in section, showing a modification of the invention.

In Fig. 7, a modification of the invention is shown, in which the bolts 19' are provided with round heads 20', having hexagonal recesses 22, for reception of a socket wrench, whereby the bolts may be turned.

Figure 8:
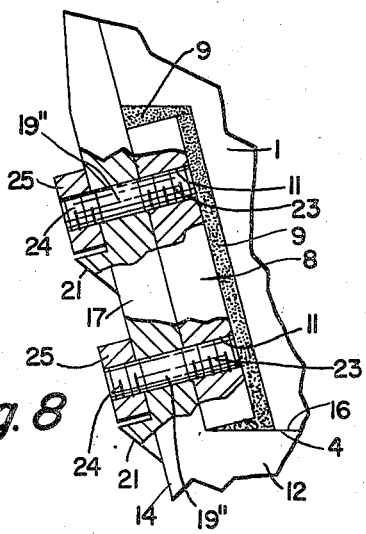
Fig. 8 is a view similar to Fig. 7, but showing another modification of the invention.

In Fig. 8, a further modification of the invention is shown, in which studs 19" are provided having threaded portions 23 which are threaded into the openings 11, and threaded portions 24, to which nuts 25 are secured, for attaching the replacement tooth 12 to the adaptor plate 8.

Figure 9:
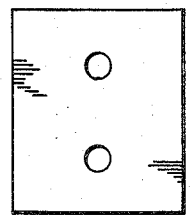
Figs. 9 and 10 are views of modified forms of adaptors.
Figure 10:
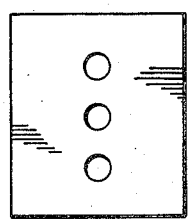

Figs. 9 and 10 show modified forms of adaptor plates, having openings which differ in number and arrangement from those of the adaptor plate 8, these being merely illustrative of many possibilities in this direction.

Figure 11:
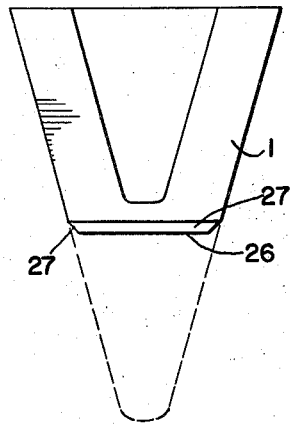
Fig. 11 is a view similar to Fig. 3, but showing another modification of the invention.
Figure 12:
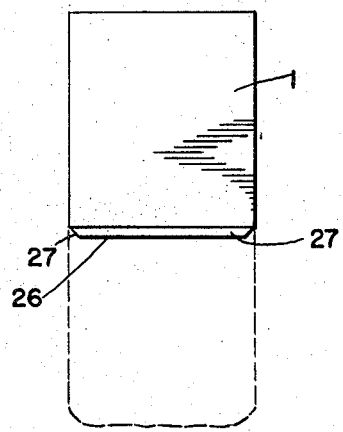
Fig. 12 is a plan view of the modification shown in Fig. 11.
Figure 13:
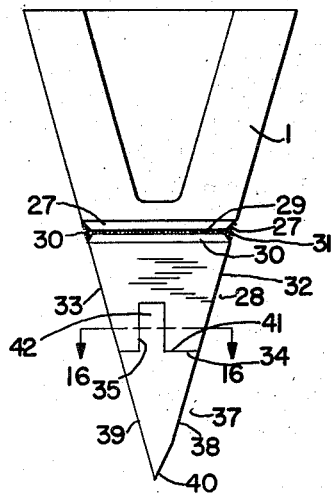
Fig. 13 is a view similar to Fig. 5, but of the repointed tooth of Figs. 11 and 12.
Figure 14:
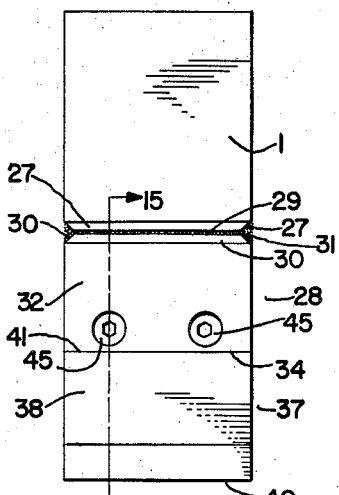
Fig. 14 is a plan view of the repointed tooth of Fig. 13.
Figure 15:
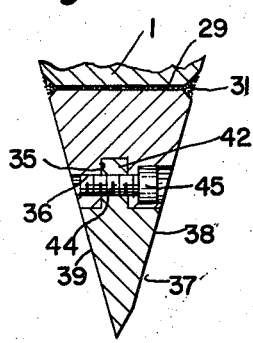
Fig. 15 is a fragmentary cross-sectional view, taken on the line 15—15 of Fig. 14
Figure 16:
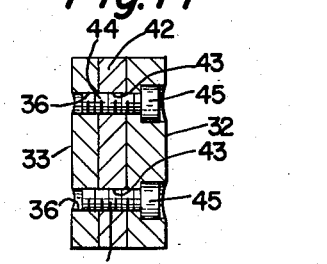
Fig. 16 is a cross-sectional view, taken on the line 16—16 of Fig. 13.

In the modification of the invention shown in Figs. 11 to 16 inclusive, the worn tooth of Figs. 1 and 2 is subjected to a flame cutting operation or other operation, in which a portion of the tooth is cut away to provide, as shown in Figs. 11 and 12, a shoulder or surface 26, which lies in a plane substantially perpendicular to the longitudinal axis of the tooth, and bevel edges 27 at the boundaries of the surface 26.

Following the removal of the portion of the worn tooth, as described, there is secured to the surface 26 an adaptor 28 (Figs. 13 and 14) having a rear surface 29 which is substantially coextensive in area with the surface 26, and has bevel edges 30 at the boundaries of the surface 29.

The adaptor 28 is permanently welded to the surface 26, as by weld metal 31 which fills the space between the surfaces 26 and 29 as well as the spaces between the bevel edges 27 and 30. The adaptor 28 is provided with converging surfaces 32 and 33 which are substantially flush with the respective upper and lower surfaces of the tooth, and has a front or forward surface 34 which is substantially parallel with the surface 29.

The surface 34 is interrupted by a recess 35 which extends from one side to the other of the adaptor. The adaptor is further provided with spaced, threaded openings 36, which serve a purpose to be presently described.

The replacement tooth is generally indicated by reference numeral 37, and is of the same width, as the tooth 1. It has top and bottom surfaces 38 and 39, respectively, which are coplanar with the surfaces 32 and 33, respectively, and converge to a relatively sharp working edge 40. The replacement tooth 37 is provided at the rear with a surface or shoulder 41 which is coextensive in area with the surface 34 of the adaptor and is adapted for abutment with the surface 34. An extension or tongue 42 extends from the surface 41 and into the recess 35, completely filling this recess.

The extension or tongue 42 is provided with spaced openings 43, which, when the replacement tooth is in proper position on the adaptor 28, are in registration with the openings 36, so that the replacement tooth may be firmly, yet removably, secured to the adaptor plate 28, by means of bolts 44, having socket heads 45. These bolts pass through the openings 43 and are threaded into the openings 36.

After the replacement tooth 37 becomes worn, additional replacement teeth may be attached to the adaptor 28, by removing the worn replacement tooth, and bolting the new teeth to the adaptor.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. The method of repointing a worn tooth of an excavating implement or the like, said method comprising the steps of removing a portion of the worn tooth to provide a surface to which an adaptor may be welded, welding to said surface an adaptor having means to which a replacement tooth may be mechanically connected, and mechanically connecting a replacement tooth to said adaptor.

2. The method, as recited in claim 1, in which the mechanical connection of the replacement tooth to the adaptor is effected by bolting said replacement tooth to said adaptor.

3. The method of repointing a worn tooth of an excavating implement or the like, said method comprising the steps of removing a portion of the worn tooth to provide a shoulder substantially perpendicular to the longitudinal axis of the tooth, and a surface substantially parallel to the bottom surface of the tooth, welding an adaptor plate to said surface, and removably attaching a replacement tooth to said adaptor plate, said replacement tooth having a shoulder adapor to bear against said shoulder of the worn tooth, and an extension adapted to overlie said adaptor plate and said bottom surface of the worn tooth.

4. The method, as recited in claim 3, in which said replacement tooth is bolted to said adaptor plate.

5. The method, as recited in claim 3, in which said replacement tooth is secured to said adaptor plate by means of studs and nuts.

6. The method of repointing a worn tooth of an excavating implement or the like, said method comprising the steps of removing a portion of the worn tooth to provide an abutment shoulder and a recess, positioning an adaptor plate in said recess, and welding said plate to the worn tooth, and then positioning a replacement tooth having a shoulder with said shoulder in abutment with said first named shoulder, and removably securing said replacement tooth to said adaptor plate.

7. In combination, a worn tooth of an excavating implement or the like, said tooth having a shoulder substantially perpendicular to the longitudinal axis of said tooth and a recess in said tooth, an adaptor plate disposed in said recess, and permanently secured in said recess, a replacement tooth having a shoulder in abutment with said first-named shoulder, and an extension overlying said adaptor plate, and means removably securing said extension to said adaptor plate.

8. The combination, as recited in claim 7, in which said means comprises headed bolts.

9. The combination, as recited in claim 7, in which said means comprises studs extending through said extension and threadedly secured to said adaptor plate and having threaded portions extending beyond said extension, and nuts secured to said last-named portions.

References Cited in the file of this patent

UNITED STATES PATENTS

| | | |
|---|---|---|
| 939,704 | Julich | Nov. 9, 1909 |
| 1,707,552 | Harrison | Apr. 2, 1929 |
| 2,369,285 | Daniel et al. | Feb. 13, 1945 |
| 2,431,639 | Goedken | Nov. 25, 1947 |
| 2,738,602 | Meeks | Mar. 20, 1956 |